(12) United States Patent
Patel et al.

(10) Patent No.: US 7,041,741 B2
(45) Date of Patent: *May 9, 2006

(54) TOUGHENED POLYMER COMPOSITIONS

(75) Inventors: Raman Patel, Cumberland, RI (US);
Harry Howard, Medina, OH (US);
Marc Caruthers, Rehoboth, MA (US);
Tonya McBride, Louisville, KY (US);
John J. Wood, III, Smithfield, RI (US);
John C. Andries, E. Greenwich, RI (US)

(73) Assignee: Teknor Apex Company, Pawtucket, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/030,243

(22) Filed: Jan. 6, 2005

(65) Prior Publication Data

US 2005/0154134 A1    Jul. 14, 2005

Related U.S. Application Data

(63) Continuation-in-part of application No. 10/754,045, filed on Jan. 8, 2004.

(51) Int. Cl.
*C08F 8/00*   (2006.01)
*C08L 9/00*   (2006.01)
*C08L 23/00*  (2006.01)
*C08L 23/04*  (2006.01)
*C08L 25/02*  (2006.01)
*C08L 33/02*  (2006.01)
*C08L 33/18*  (2006.01)
*C08L 33/20*  (2006.01)

(52) U.S. Cl. .................. 525/191; 525/221; 525/222; 525/232; 525/238; 525/240; 525/241

(58) Field of Classification Search ................ 525/191, 525/221, 222, 232, 238, 240, 241
See application file for complete search history.

(56) References Cited

U.S. PATENT DOCUMENTS

| | | | |
|---|---|---|---|
| 4,104,210 A | * | 8/1978 | Coran et al. ............. 525/232 |
| 4,130,535 A | | 12/1978 | Coran et al. |
| 4,141,878 A | * | 2/1979 | Coran et al. ............. 524/528 |
| 4,195,000 A | | 3/1980 | Charles et al. |
| 4,616,042 A | | 10/1986 | Avakian |
| 4,753,980 A | | 6/1988 | Deyrup |
| 4,833,194 A | | 5/1989 | Kuan et al. |
| 4,861,828 A | | 8/1989 | Waggoner |
| 5,008,332 A | | 4/1991 | Sano et al. |
| 5,055,525 A | | 10/1991 | Henton et al. |
| 5,104,924 A | | 4/1992 | Goetz et al. |
| 5,237,000 A | | 8/1993 | Lausberg et al. |
| 5,266,638 A | | 11/1993 | Niessner et al. |
| 5,277,864 A | | 1/1994 | Blatz |
| 5,290,886 A | | 3/1994 | Ellul |
| 5,310,800 A | | 5/1994 | Shimizu et al. |
| 5,338,801 A | | 8/1994 | Eppert, Jr. |
| 5,552,482 A | | 9/1996 | Berta |
| 5,556,908 A | | 9/1996 | Chung et al. |
| 5,594,059 A | | 1/1997 | Mason et al. |
| 5,723,528 A | | 3/1998 | Mason |
| 5,726,236 A | | 3/1998 | Mason et al. |
| 5,817,723 A | | 10/1998 | Flexman, Jr. et al. |
| 5,861,463 A | | 1/1999 | Sehanobish et al. |
| 5,936,058 A | | 8/1999 | Schauder |
| 6,020,046 A | | 2/2000 | Abhau |
| 6,060,549 A | | 5/2000 | Li et al. |
| 6,140,420 A | | 10/2000 | Sehanobish et al. |
| 6,217,961 B1 | | 4/2001 | Hert et al. |
| 6,218,474 B1 | | 4/2001 | Valligny et al. |
| 6,281,286 B1 | | 8/2001 | Chorvath et al. |
| 6,500,900 B1 | | 12/2002 | Itoh |
| 2002/0072561 A1 | | 6/2002 | Johoji et al. |
| 2002/0188079 A1 | | 12/2002 | Qiao et al. |
| 2003/0119988 A1 | | 6/2003 | Johnson et al. |
| 2005/0154134 A1 | * | 7/2005 | Patel et al. ............. 525/191 |

* cited by examiner

*Primary Examiner*—Nathan M. Nutter
(74) *Attorney, Agent, or Firm*—Hudak, Shunk & Farine Co. LPA

(57) ABSTRACT

Toughened thermoplastic compositions comprising a thermoplastic polymer toughened by the inclusion of a thermoplastic elastomer derived from a particulate rubber dynamically vulcanized in the presence of a matrix polymer. The toughened thermoplastic composition exhibits properties including toughness, improved impact resistance, and improved hardness. The compositions are utilized wherever toughened, high performance polymers are desired. A method for forming the toughened polymer compositions is also described. Processing methods, such as rotational molding, utilizing the toughened polymer compositions are described.

29 Claims, No Drawings

TOUGHENED POLYMER COMPOSITIONS

CROSS REFERENCE

This application is a continuation-in-part of related application Ser. No. 10/754,045 filed Jan. 8, 2004, for TOUGHENED POLYMER COMPOSITIONS.

FIELD OF THE INVENTION

The present invention is directed to thermoplastic polymer compositions, which are toughened by the inclusion of a thermoplastic elastomer component comprising a particulate rubber component dynamically vulcanized in the presence of a matrix polymer. The toughened polymer compositions comprising a blend of a thermoplastic polymer component and the crosslinked particulate elastomer in a matrix polymer exhibit properties including toughness, improved impact resistance, and improved hardness.

BACKGROUND OF THE INVENTION

Various polymer and rubber compositions, and combinations have been proposed as an attempt to achieve desirable properties such as toughness and rigidity for use in certain applications. One prior art approach teaches modification of a polymer by grafting rubber on the polymer chain backbone. A second approach involves the use of core and shell structure as an impact modifier, wherein an elastomeric core is surrounded by a polymeric shell. A third approach involves physically blending an uncured elastomer and a thermoplastic.

With respect to the field of rotational molding, polymer processors must compromise between existing resins having either a sufficient hardness or impact strength. Typical rubber modified polymers such as impact polystyrene and ABS cannot be rotationally molded easily, or even at all. The rubber component is not stable during the relatively long molding time cycles. Further problems include inconsistent, non-uniform melt flow of the different polymer components of the blend, and molded articles exhibiting webbing and/or having rough surface textures.

Even though various elastomeric polymer combinations exist, the molding and processing industry still seeks polymeric compositions which are toughened and exhibit hardness and impact resistance, while being processable in conventional equipment.

SUMMARY OF THE INVENTION

The toughened polymer compositions of the present invention are physical blends of a thermoplastic polymer component and a thermoplastic elastomer or vulcanizate component. The elastomer component includes a rubber component that is dynamically vulcanized in the presence of a matrix polymer prior to blending with the thermoplastic polymer component. Preferably, crystalline polymers are utilized as the thermoplastic polymer component. The toughened polymer compositions optionally contain fillers including nano-size fillers, flame retardants, lubricants, stabilizers, processing aids, colorants, or other additives. A method for preparing the toughened polymer compositions is described.

Unexpectedly, the toughened polymer compositions are impact resistant and exhibit high Rockwell "R" hardness. The toughened compositions are used in various applications, as well as processes such as extrusion, injection molding, blow molding, compression molding, thermoforming, rotational molding, or any other process where thermoplastic polymers are utilized.

In a further embodiment, the toughened polymer compositions are used to form rotationally molded articles which are impact resistant while having excellent hardness. Methods for producing articles from the toughened polymer compositions are described.

DETAILED DESCRIPTION OF THE INVENTION

The toughened polymer compositions of the invention comprise a blend of a thermoplastic polymer component and a thermoplastic elastomer or vulcanizate component. The elastomer component is prepared by dynamically vulcanizing a rubber component in a blend also comprising a matrix polymer. The vulcanized rubber component is dispersed in the matrix polymer, and subsequently in the thermoplastic polymer component, as particles, preferably micron sized particles.

The thermoplastic polymer component of the toughened polymer composition generally has an ordered or substantially ordered structure and is thus crystalline or semicrystalline. The thermoplastic polymers utilized in the toughened polymer compositions exhibit a relatively clear or sharp melting point as well as a glass transition temperature (Tg). Conversely, amorphous polymers which are not preferred, exhibit only a Tg and have no melting point.

Non-limiting specific examples of the crystalline or semicrystalline thermoplastic polymer components used in the present invention are polyolefins, polyamides, polyesters, halogen-containing thermoplastics such as polyvinylidene chloride, and the copolymers thereof. Blends of the thermoplastic polymers can be used. Compatibilizers are used to form compatabilized blends where the polymers are not compatible. Polyolefins, polyamides and polyesters are preferred, with the polyolefins being most preferred.

Examples of the polyolefins which are used as a thermoplastic component in the present invention are polymers derived from linear or branched olefin monomers having from 2 to about 14 carbon atoms, preferably from 2 to about 6 carbon atoms or mixtures thereof, such as, but not limited to, ethylene, propylene, butene, pentene, hexene, heptene, 2-methyl-1-propene, 3-methyl-1-pentene, 4-methyl-1-pentene, and 5-methyl-1-hexene.

In a preferred embodiment, the thermoplastic polymer component comprises a homopolymer in an amount generally greater than 50% by weight, desirably from about 65% or about 80% to 100% by weight and preferably from about 90% to 100% by weight based on the total weight of the thermoplastic polymer component. Thus, thermoplastic homopolymers are preferred as opposed to the thermoplastic polymer component being a copolymer.

Polyolefins also include, but are not limited to, low density polyethylene, high density polyethylene, linear low density polyethylene, polypropylene (isotactic and syndiotactic), polybutene, and a copolymer of the greater part by weight of an olefin and a lesser amount of a vinyl monomer such as vinyl acetate. In a preferred embodiment, the polyolefin utilized in the thermoplastic polymer component is substantially free of functional groups. Of the defined olefinic polymers, polyethylene such as high-density polyethylene, and polypropylene are preferred from the standpoint of molding processability, resistance to chemicals, cost, etc. Polyolefins are commercially available from commercial sources including, but not limited to, Chevron, Dow Chemical, DuPont, Exxon Mobil, Huntsman Polymers, Ticona, and Westlake Polymer under various designations, in various molecular weights and molecular weight distributions.

Examples of the polyamides which can be used in the present invention in one embodiment include, but are not limited to, polymers and copolymers formed by polycondensation of a diamine having from 4 to 12 carbon atoms, and a dibasic acid having from 4 to 12 carbon atoms, selfpolycondensation of an amino acid, or polymerization of a lactam, i.e. ring-opening polymerization. Specific examples of the polyamide include, but are not limited to, nylons such as nylon-4, nylon-4,6, polyhexamethyleneadipamide (nylon-6,6), polycaprolactam (nylon-6), nylon 6,9, polyhexamethylenesebacamide (nylon-6,10), nylon-11, nylon-12 and copolymers thereof. Polyamides are commercially available from sources such as Albis, Clariant, Firestone, Ticona, Bayer, Ferro, DuPont and BASF under various designations. Preferred polyamides are nylon-6 and nylon-6,6 which are available from BASF, of Wyandotte, Mich. as the Ultramide® series.

The polyesters which can be used in the present invention in one embodiment are well known in the art and are linear polyesters or linear copolyesters composed of a unit obtained by condensation-reaction of a dicarboxylic acid either aromatic or aliphatic, or a derivative thereof having a total of from about 2 to about 16 carbon atoms; and a diol or a derivative thereof having a total of from about 2 to about 16 carbon atoms as the main structural component. Polyesters can also be prepared by self condensation of a hydroxy carboxylic acid, or ring opening polymerization of a lactone. One can also introduce a small amount of triol or a higher alcohol to promote branching. Examples of the polyester include, but are not limited to, polyethylene terephthalate, polybutylene terephthalate, polyethylene isophthalate, and block polyetheresters such as one sold under the trade name "Hytrel" (available from DuPont). The preferred polyester, polybutylene terephthalate, is available from GE Plastics, Pittsfield, Mass. as Valox®. Polyesters are commercially available from sources such as Adell, BASF, Clariant, DuPont, Ticona, GE, and Noveon under various designations.

The thermoplastic elastomer or vulcanizate (TPV) component of the toughened polymer composition includes at least one cured elastomer or rubber component and at least one thermoplastic matrix polymer. The rubber component is crosslinked so that generally greater than about 60%, and desirably greater than about 80% and preferably greater than about 95% by weight is insoluble in an appropriate solvent in which the non-crosslinked rubber is soluble. The TPV component optionally contains additional rubbers or elastomers which may or may not be dynamically crosslinked; or one or more thermoplastic matrix polymers; or a combination thereof.

The rubber component of the thermoplastic elastomer includes one or more rubbers. In one embodiment, the rubber component of the elastomer comprises a thermoplastic olefin rubber. Preferably the rubber component comprises a copolymer, i.e., two or more different alpha olefin monomers, for example ethylene and propylene (EP or EPM rubber), 1-butene, 1-hexene, 2-methyl-1-propene, 1-pentene, 3- or 4-methyl-1-pentene or 1-octene. The monoolefin rubbers are saturated. A terpolymer of two or more different alpha olefin monomers such as ethylene or propylene, and at least one polyene, such as a diene monomer (EPDM rubber) has unsaturation sites for efficient crosslinking or vulcanization and is a preferred elastomer for use with olefinic matrix polymers. The at least one diene monomer, is preferably non-conjugated diene and generally has from 5 to about 20 carbon atoms, with about 6 to about 12 carbon atoms being preferred. Examples of specific dienes include, but are not limited to, 1,4-pentadiene; 1,4-hexadiene; cyclic dienes such as cyclooctadiene and 1,3-cyclopentadiene; and bridged cyclic dienes such as norbornene, 5-methylene-2-norbornene, 5-ethylidene-2-norbornene, dicyclopentadiene, vinyl norbornene, and the like; with norbornenes and dicyclopentadiene being desired, and a hexadiene such as 1,4-hexadiene and norbornenes being preferred. The amount of the diene component utilized in the EPDM is from about 0.5 to about 12 percent by weight and preferably from about 2 to about 8 percent by weight based upon the total weight of the rubber forming monomers, for example, the ethylene, the propylene, and the at least one diene monomer. EP rubber and EPDM rubber and the methods for producing the same are well known in the art and are commercially available from numerous sources including, Dupont Dow, Bayer, DSM Elastomers, Exxon Mobile, Nizh USA, and Uniroyal under various designations.

Other rubbers are used in the instant invention in some embodiments. They include styrene butadiene rubber, hydrogenated styrene butadiene rubber, butyl rubber, butyl-paramethyl styrene copolymer and its functionalized derivatives such as a brominated version or one that is modified by acrylic monomers, and styrenic block copolymers such as SEBS, SEPS and SIBS which are crosslinked by peroxides with or without coagents or other appropriate crosslinking agents. Other examples of rubbers include, but are not limited to acrylic rubber, nitrile rubber, hydrogenated nitrile rubber, urethane rubber and ethylene methacrylate terpolymer rubber. Rubbers not compatible with the matrix polymer or thermoplastic polymer component require the use of a compatibilizer, which are also known to those of ordinary skill in the art. The rubbers are well known to the art and the literature and are commercially available from sources such as Bayer, Ameripol Synpol, Goodyear, Intertex, DuPont, and Zeon Chemicals. Most of the rubbers are described in the Rubber Blue Book, published by Rubber World Magazine (2003) herein incorporated by reference.

Acrylic rubbers are preferred in many embodiments of the present invention. Generally two types of acrylic rubbers are prepared in the industry. One type is derived from acrylic monomers and cure site monomers which provide sites for crosslinking. The second type of acrylic rubber is derived from a combination of acrylate monomer(s), olefin monomer(s) such as ethylene, and one or more cure site monomers. Acrylic rubbers are typically formed using emulsion or solution polymerization, which is preferred for ethylene/ acrylic type rubbers. Acrylate monomers include, but are not limited to, methyl acrylate, ethyl acrylate, propyl acrylate, and butyl acrylate. Acrylate monomers also include alkoxy acrylates such as methoxy ethyl acrylate and ethoxy ethyl acrylate, etc. Because acrylic rubbers have a saturated backbone, crosslinking is accomplished via incorporation of the copolymerized reactive cure site monomers. Cure site monomers can vary, and can include a carboxylic acid, for example. Ethylene/acrylate type rubbers are generally cured with di- or polyfunctional amine, isocyanate, epoxy, or peroxide curing agents. Acrylic rubbers are commercially available from various companies such as B.F. Goodrich of Charlotte, N.C. as Hycar®, American Cyanimid as Cyanacryl®, and DuPont of Wilmington, Del. as Vamac® and Elf Atochem, of Exton, Pa. as Lotader® or Lotryl®.

The rubber component is present in an amount generally from about 40 to about 80 or about 90 parts, desirably from about 45 or about 55 to about 70 or about 75 parts by weight based on 100 parts by weight of the rubber and thermoplastic matrix polymer in the thermoplastic elastomer component.

The thermoplastic elastomer component also includes a matrix polymer which is blended with the rubber before the rubber is cured or dynamically vulcanized. In a preferred embodiment, the matrix polymer is a polyolefin derived from substituted or unsubstituted olefin monomers having from 2 to about 14 carbon atoms, with 2 to about 6 carbon atoms preferred. Likewise, polyamides, polyesters, or halogen-containing thermoplastics as described hereinabove can also be used as the matrix polymer. The matrix polymer is chosen to be compatible with the thermoplastic polymer component. Compatibilizers are used in some embodiments when the matrix polymer is not otherwise compatible with the thermoplastic polymer component. Examples of suitable olefin monomers include, but are not limited to, ethylene, propylene, butene, pentene, hexene, heptene, and the like. The preferred olefins are ethylene and propylene. Examples of various polyesters, polyamides, and halogenated polymers are described hereinabove with respect to the thermoplastic polymer component and are hereby incorporated by reference.

Blends of matrix polymers are used in the thermoplastic elastomer component in some embodiments. In one embodiment the matrix polymer is different than the thermoplastic polymer component. In another embodiment the matrix polymer is the same type of polymer as the thermoplastic polymer component, with the proviso that the number average molecular weight can be either the same or different. In a further embodiment the matrix polymer comprises a homopolymer in an amount generally greater than 70% by weight, desirably from about 80% to about 100% by weight, and preferably from about 90% to about 100% by weight based on the total weight of the matrix polymer. Thus, homopolymer matrix polymers are preferred as opposed to the matrix polymer comprising a greater amount of a copolymer.

One preferred embodiment utilizes a matrix polymer comprising polypropylene having a melt index of greater than 3 g or 3.5 g per 10 minutes at 230° C. under a load of 2.16 kg according to ASTM D1238.

The matrix polymer component is present in the thermoplastic elastomer in a range generally from about 10 or about 20 to about 60 parts, and desirably from about 25 or about 30 to about 45 or about 55 parts per 100 parts by weight of the rubber and matrix polymer in the thermoplastic elastomer component. Matrix polymers for the thermoplastic elastomer component are commercially available from sources as listed above with respect to the thermoplastic polymer component.

An important aspect of the present invention is to utilize at least one vulcanizing agent or crosslinker to crosslink the rubber component of the thermoplastic elastomer. The choice of a crosslinking agent depends upon the rubber component. If the rubber component has no unsaturation or other functional group, then suitable crosslinking agents are peroxides. Specific examples of peroxide crosslinking agents include, but are not limited to, dibenzoyl peroxide, dicumyl peroxide, 1,3-bis(t-butylperoxyisopropyl)benzene, di-t-butyl peroxide, dilauroyl peroxide, 2,5-dimethyl-2,5-bis (t-butylperoxy)hexane, 2,5-dimethyl-2,5-bis(t-butylperoxy) hexene-3 and di(t-butylperoxy)perbenzoate, or a combination thereof. Peroxides may be used with crosslinker coagents to improve the crosslinking efficiency. The common coagents used with peroxides have two or more unsaturated groups, or labile hydrogen groups. Examples are triallyl cyanuarate; triallyl isocyanurate; di, tri and tetra methyacrylates and acrylates such as those available from ATOChem under the trade name Sartomer®; liquid butadiene; and the like. Siloxane is an example of the latter type coagent. For elastomers with unsaturation, the peroxides described above are utilized in one embodiment. In addition to the peroxides, alternative curatives include sulfur based curatives, dimethylol phenol (which is halogenated or non-halogenated) with Lewis acids, or silicone prepolymers with two or more SiH groups. The latter uses small amount of platinum or other metal complexes as a catalyst. If the elastomer has a functional group, such as an acid, amine, isocyanate, epoxy or the like, curatives include a bifunctional or polyfunctional compound, or a polymer that will react with that particular group as a curative. Non-limiting specific examples of such crosslinking agents include metal oxides such as magnesium oxide, isocyanate prepolymers such as Mondur® available from Bayer of Baytown, Tex., and neopentyl (diallyl)oxytri(N-ethylenediamino)ethyl titanate. Thus, for an acid functional rubber or elastomer, curatives include a compound, a prepolymer, or polymer containing an epoxy, alcohol, isocyanate, amine and the like functionalities that will react with the acid group.

The amount of crosslinking agent will depend upon the functionality and molecular weight of the crosslinking agent and desired level of crosslinking. That said, the amount of crosslinking or vulcanizing agent is generally small and ranges from about 0.5 to about 15 parts by weight, desirably from about 0.75 to about 10 parts by weight, and preferably from about 1 to about 6 parts by weight, based on 100 parts by weight of the rubber component.

In addition to the above-identified components, the thermoplastic elastomer component of the present invention optionally include various additives, fillers, lubricants, stabilizers, accelerators, processing aids, compatibilizers, flame retardants, dispersing aids, colorants, and the like, which are utilized in conventional amounts. Non-limiting examples of fillers include both organic and inorganic fillers such as silica, organically modified silica, talc, clay, and fibers such as wood fibers or glass fibers. Non-limiting examples of pigments or colorants include carbon black and titanium dioxide.

The thermoplastic elastomer composition is formed by combining, i.e., mixing, blending or the like, predetermined amounts of the rubber component, matrix polymer component, crosslinking agent, and any other optional components together and then dynamically vulcanizing the composition. Dynamic vulcanization is typically characterized as a process, well known to those of ordinary skill in the art, wherein at least one rubber is crosslinked in the presence of at least one non-vulcanizing polymer, for example a thermoplastic matrix polymer, while the blend is mixed, preferably at an elevated temperature which promotes said crosslinking.

Any melt mixing, masticating, or kneading apparatuses or methods as known in the art are utilized to prepare the thermoplastic elastomer composition, including apparatuses such as, but not limited to, roll mills, Banbury mixers, Brabender mixers, and extruders, with twin screw extruders being preferred. The temperature for dynamic vulcanization to form the crosslinked elastomer will depend upon the melting point of the thermoplastic matrix. Usually the temperature used is about 10° C. or more higher than the matrix melt temperature. Also, desired rate of reaction and crosslinking agent type also dictate the temperature used. The temperature for dynamic vulcanization to form the elastomer ranges generally from about 100° C. to about 280° C. The dynamic vulcanization of the uncured rubber is performed for a predetermined length of time until the desired degree of crosslinking is obtained, and ranges generally from about 0.1 to about 10 minutes, and preferably from about 1 to about 3 minutes. The crosslinking of the rubber is dependent on many factors including the composition temperature, amount of crosslinking agent present, and shear rate, etc.

In a preferred embodiment, the thermoplastic elastomer composition is prepared by melt blending the matrix polymer and the rubber component, fillers, appropriate additives and extender oil in a first step. In a second step, the crosslinking agent is added to the melt mixed blend and mixing is continued until the crosslinking reaction is completed to the desired degree. Afterwards, any additional components are added and the thermoplastic elastomer is mixed for a further period of time, such as about 1 to about 5 minutes.

The melt mixed, dynamically vulcanized thermoplastic elastomer composition is formed into a desired end product such as a pellet, chip, flake, or the like.

The thermoplastic elastomer component thus includes the cured rubber component and the thermoplastic matrix polymer. The thermoplastic elastomer is preferably in the form of a mixture with the rubber component in the form of dispersed micron sized rubber particles within the continuous phase matrix polymer. The cured rubber component particles have an average particle size generally from about 0.005 to about 25 microns, desirably from about 0.05 to about 15 microns, and preferably from about 0.1 to about 10 microns.

Once dynamically vulcanized, the thermoplastic elastomer composition is blended with the thermoplastic polymer component. That is, the toughened polymers of the present invention are a blend of the crystalline or semi-crystalline thermoplastic polymer component and the crosslinked thermoplastic elastomer component comprising the crosslinked rubber component and the matrix polymer. Preferably the thermoplastic elastomer component is compatible with the thermoplastic component. Otherwise, a compatabilizer is used to provide compatibility. Such compatibilizers are known to those of ordinary skill in the art. The blend is prepared according to conventional compounding methods by combining the components, and then preferably melt processing at a predetermined temperature in a suitable apparatus. The blend is melt processed at a temperature above the melting point of the thermoplastic polymer component, desirably about 10° C. to about 50° C. above the melting point, and preferably from about 20 to about 30° C. above melting point of the thermoplastic component, but below any decomposition temperature of any of the components.

As the amounts of both the matrix polymer and thermoplastic polymer component can each vary by weight in relation to the rubber component, one characterization of the invention defines the rubber component in relation to 100 total parts by weight of any thermoplastic utilized, i.e., both the matrix polymer and the thermoplastic polymer component. The toughened polymer composition comprises the rubber component of the thermoplastic elastomer component in a range generally from about 2 to about 60 parts, desirably from about 5 or about 10 to about 50 parts, and preferably from about 8 or about 15, or about 18 to about 42 or about 45 parts per 100 total parts by weight of the matrix polymer and thermoplastic polymer component.

The toughened polymer compositions of the present invention utilize relatively low amounts of extender or rubber processing oil known to the literature and to the art. The amount of oil in the toughened polymer compositions of the present invention is less than about 35 parts, desirably less than about 25 parts, and preferably less than about 20 or about 15 parts per 100 total parts by weight of the rubber component.

Additionally, the toughened polymer compositions are substantially free of plasticizers. The amount of plasticizer in the composition is generally less than about 10 parts, desirably less than about 5 parts and preferably less than about 3 parts or nil, by weight per 100 total parts by weight of thermoplastic polymer and matrix polymer.

In addition to the above-identified components, the toughened polymer blend of the present invention optionally includes various additives, fillers, lubricants, stabilizers, processing aids, antidegradants, waxes, fibers such as glass, wood, or cellulose fibers, clay, silica, compatibilizers, flame retardants, dispersing aids, colorants, and the like, which are utilized in conventional amounts as known to the art and to the literature. As with the formation of the thermoplastic elastomer composition, the toughened polymer compositions are melt processed utilizing standard equipment known to the art such as roll mills, Banbury mixers such as Brabender mixers, and extruders, with twin screw extruders being preferred.

After the components of the toughened polymer compositions have been mixed or blended, and preferably melt mixed, the blend is then processed into a desired form utilizing equipment known in the art such as pelletizers to form particles such as pellets, chips, flakes, spheres or the like. The toughened polymer composition can be subsequently reprocessed utilizing any known polymer processing equipment to form suitable articles as the elastomer morphology is not altered by further processing thus retaining desired properties. In a preferred embodiment, the toughened polymer composition is prepared in an extruder, subsequently pelletized and dried.

The toughened polymer compositions unexpectedly have a high Rockwell "R" hardness as well as the relatively high impact resistance when compared to the thermoplastic component alone. The toughened polymer compositions are formulated to have a greater hardness while at least maintaining impact properties, or greater impact resistance while at least maintaining hardness, and preferably to have both greater hardness and impact resistance, when compared to the thermoplastic polymer component blended with an uncured thermoplastic elastomer component. In a preferred embodiment, the toughened polymer compositions have a notched izod impact at minus 40° C. of at least 1.0 ft.-lb/in and preferably at least 1.3 ft.-lb/in as measured by ASTM D256. It has been found that when polyesters are utilized as the thermoplastic polymer component as well as the matrix polymer at a concentration of ≦85 parts by 100 parts by weight total polyester and rubber, notched izod impact values at −20° C. of at least 3.0 ft.-lb/in, and preferably at least 3.75 ft.-lb/in are obtained as measured according to ASTM D256. Likewise, when the polyester concentration is ≦75 parts per 100 total parts by weight polyester and rubber, notched izod impact at −20° C. of at least 4.75 ft.-lb/in. and preferably at least 5.0 ft.-lb/in are obtained as measured according to ASTM D256. It has been found when polyamides are utilized for the thermoplastic polymer component as well as matrix polymer at a concentration of ≦85 parts by 100 parts by weight polyamide and rubber, notched izod impact values at −20° C. of at least 1 ft.-lb/in, and preferably at least 2 ft.-lb/in are obtained as measured by ASTM D256. Likewise, when the polyamide concentration is ≦75 parts per 100 total parts by weight polyamide and rubber, notched izod impact at −20° C. of at least 3.25 ft.-lb/in and preferably at least 4.0 ft.-lb/in are obtained as measured by ASTM D256.

The toughened polymer compositions are useful in any application wherein a toughened polymeric product or article is desired. The toughened polymer compositions are utilized in numerous processes known in the art including, but not limited to, extrusion, injection molding, blow molding, compression molding, thermoforming, and rotational molding.

The toughened polymer compositions are formed into generally any plastic good or item including, but not limited to, display racks, carts such as food carts, medical carts and farm carts, instrument housings, watercraft such as kayaks, boats and canoes, items for agricultural applications such as corn picker points, truck boxes, beverage containers, planter pots, newspaper cabinets, tables, coolers, furniture, storage trays, tanks such as fuel tanks and water tanks, playground equipment and bed liners.

It has been unexpectedly found that the toughened polymer compositions of the present invention are particularly suitable for producing rotationally molded articles. The toughened polymer compositions when rotationally molded, produce parts having high surface quality with excellent hardness as well as impact strength. During rotational molding, polymeric compositions are subjected to relatively high temperatures for extended periods of time as compared to injection molding. It is known to art that uncured rubber-containing compositions are not suitable for rotational molding as the rubber is not stable during the extended period of molding time. For example, impact polystyrene and ABS produce rotationally molded articles having poor surface quality due to the instability and degradation of the rubber-like components of the compositions. Moreover, heretofore uniform melt flow could not be obtained, thus producing rotationally molded articles with irregular, and rough surfaces, etc. It has been found that the vulcanized thermoplastic elastomer component of the toughened polymer blend having the defined particle size allows rotationally molded articles to be produced having excellent surface quality.

Rotational molding devices are well known to those of ordinary skill in the art and are commercially available from Ferry Industries, Alan Yorke Engineering LTD, and Caccia Engineering S.p.A. Generally any type of rotational molding apparatus can be utilized, such as turret machines, shuttle machines, hybrid shuttle/rocking oven machines, swing machines, rock and roll machines, clamshell machines, vertical wheel machines, and the like. Rotational molding devices generally include a loading/unloading station, an oven station and a cool down station.

Rotational molding of the toughened polymer compositions of the present invention is accomplished in one embodiment as follows. A predetermined amount of the toughened polymer composition and any optional additives such as, but not limited to, colorants, stabilizers, flame retardants, etc. are added to a mold that is in the shape of the article to be molded. Preferably the toughened polymer is added in the form of a powder or other small particle. The mold is also preferably vented to prevent flash at the parting line as well as warping. The mold is subsequently closed and transferred to the oven section or heating zone wherein the mold is rotated at an elevated temperature above the melting point of the toughened polymer composition and generally at a temperature from about 500° F. (260° C.) to about 700° F. (371° C.).

In a preferred embodiment, the mold is rotated about a horizontal and a vertical axis simultaneously. Rotation speed for each axis, independently ranges from about 1 to about 25 or 50 rpm, and generally from about 2 to about 20 rpm. For example, in one embodiment the mold can be rotated at 15 rpm about a horizontal axis and about 3 rpm in the vertical axis. The mold is maintained in the oven section for a predetermined period of time such as generally from about 8 minutes to about 25 minutes or more, and preferably from about 10 to about 15 minutes.

Afterwards, the mold containing the toughened polymer composition is preferably moved to a cooling station and cooled to ambient temperature. Means for cooling the mold include the use of one or more fans, water sprayers or the like. The article formed in the mold from the toughened polymer composition is removed from the mold after cooling.

Toughened polymer articles formed by rotational molding can be formed in one piece and are virtually stress free. Uniform wall thicknesses can be obtained with substantially no thinning at the extremities. Numerous different articles are formed ranging from small and intricate items to large and complex items, some of which are noted above. Articles are also formed having metal inserts and/or double walled moldings.

The present invention will be better understood by reference to the following examples which serve to describe, but not to limit, the present invention.

EXAMPLES

Examples of the toughened polymer compositions of the present invention including the thermoplastic polymer component and thermoplastic elastomer component were prepared as described hereinbelow. The toughened polymer compositions were compared to the control formulations described below. The results show that the toughened polymer compositions exhibit improved impact resistance and/or hardness when compared to control formulations.

Example 1

A thermoplastic elastomer component was prepared in a first step, wherein a rubber component was blended with a matrix polymer in amounts as listed in Table I and subsequently cured. A control formulation was also prepared including a rubber component and a matrix polymer. The control formulation was not cured during melt blending as it lacked a crosslinking agent. The thermoplastic elastomer component and control formulation were each melt blended at a temperature of 200° C. for about 30 seconds in a twin screw extruder at 200 RPM. A peroxide curative, α,α'-bis(tert-butylperoxy)-diisopropylbenzene, was added to the thermoplastic elastomer component and mixed for about 30–40 seconds until the reaction was completed. The control was mixed for the same length of time, but no curative was utilized. The thermoplastic elastomer component and control were each then pelletized. Afterwards, the thermoplastic elastomer component and control formulation were individually blended with a thermoplastic polymer component in the amounts shown in Table IA. The blends were melt mixed at 210° C. for about 1 to 2 minutes in a twin screw extruder at 200 RPM and subsequently pelletized. Test samples were produced by injection molding at about 220° C. The various compositions exhibited the properties listed in the tables.

The results listed in Table IA show that the toughened polymer compositions of the present invention exhibit higher tensile strength, greater hardness, and higher notched izod impact value at both room and low temperatures when compared to the control formulations at different thermoplastic polymer component levels.

TABLE I

|  | Thermoplastic Elastomer Composition 1 | Control 1 |
| --- | --- | --- |
| EPDM Rubber[1] (rubber component) | 100 | 100 |
| Polypropylene[2] (matrix polymer) | 90 | 90 |
| Polyethylene[3] (matrix polymer) | 6 | 6 |
| Calcium Carbonate | 10 | 10 |
| Liquid Polybutadiene[4] | 5 | 0.0 |
| Peroxide[5] (crosslinking agent) | 1.10 | 0.0 |
| UV Stabilizer[6] | 1.80 | 1.80 |
| Calcium Stearate | 0.55 | 0.55 |
| Polyethylene Wax | 1.25 | 1.25 |
| Processing Oil[7] | 10.0 | 10.0 |
| TOTAL (parts by weight) | 225.70 | 219.60 |

[1]Royalene 525 (Uniroyal)
[2]Fortilene 9000 (Solvay Polymers)
[3]HDPE 6.5MI T60-500 (Solvay Polymers)
[4]Ricon (Ricon Polymers)
[5]Vulcup 40 KE (GEO Specialty Chemicals)
[6]50/50 Irganox 1010 and Irgafos 168 (Ciba Geigy)
[7]Semtol (Witco)

TABLE IA

|  | Example 1 | Control Ex. 1 | Example 2 | Control Ex. 2 | Example 3 | Control Ex. 3 |
| --- | --- | --- | --- | --- | --- | --- |
| Thermoplastic Elastomer Composition (parts by weight) (Table I) | 225.70 | — | 225.70 | — | 225.70 | — |
| Control 1 (parts by weight) (Table I) | — | 219.60 | — | 219.60 | — | 219.60 |
| Polypropylene[8] (thermoplastic polymer component) (parts by weight) | 150 | 150 | 250 | 250 | 350 | 350 |
| TOTAL (parts by weight) | 375.70 | 369.60 | 475.70 | 469.60 | 575.70 | 569.60 |
| Rubber component parts per 100 parts by weight matrix polymer and | 40.65 | 40.65 | 28.90 | 28.90 | 22.42 | 22.42 |

TABLE IA-continued

|  | Example 1 | Control Ex. 1 | Example 2 | Control Ex. 2 | Example 3 | Control Ex. 3 |
|---|---|---|---|---|---|---|
| thermoplastic polymer component |  |  |  |  |  |  |
| CROSSLINKED RUBBER, Wt. % | 26.617 | 27.056 | 21.022 | 21.295 | 17.370 | 17.556 |
| POLYOLEFIN, Wt. % | 65.480 | 66.558 | 72.735 | 73.680 | 77.471 | 78.301 |
| Oil, Wt. % | 2.662 | 2.706 | 2.102 | 2.129 | 1.737 | 1.756 |
| OTHERS, Wt. % | 5.243 | 3.680 | 4.141 | 2.896 | 3.422 | 2.388 |
| TOTAL WEIGHT % | 100.0 | 100.0 | 100.0 | 100.0 | 100.0 | 100.0 |
| Specific Gravity (ASTM D792) | 0.91 | 0.92 | 0.90 | 0.91 | 0.91 | 0.91 |
| Hardness, Shore D(Inst/10 Sec.) (ASTM D2240) | 66/60 | 65/59 | 72/68 | 68/60 | 75/71 | 71/65 |
| Hardness, Rockwell "R" (ASTM D785) | 33.7 | — | 49.3 | — | 54.2 | — |
| Tensile Strength(2"/min), Psi (ASTM D638) | 3460 | 2670 | 3640 | 3080 | 3460 | 3450 |
| Elongation @ Break(2"/min), % (ASTM D638) | 570 | 610 | 500 | 680 | 510 | 490 |
| Low Temperature Break, °C. (ASTM D746) | ~−60 | −50 | −47 | −50 | −42 | −40 |
| MI, g/10 min (230° C./2.16 kg) (ASTM D1238) | 0.77 | 1.30 | 1.51 | 2.25 | 2.12 | 2.53 |
| MI, g/10 min (230° C./5.0 kg) (ASTM D1238) | 4.39 | 5.66 | 7.60 | 10.50 | 10.65 | 12.00 |
| Unnotched Izod Impact, Ft-lb/in (@ ~23° C.) (ASTM D256) | No break | No break | No break | No break | No break | 18.2 |
| Unnotched Izod Impact, Ft-lb/in (@ ~−40° C.) (ASTM D256) | No break | 21.2 | No break | 13.1 | No break | 10.9 |
| Notched Izod Impact, Ft-lb/in (@ ~23° C.) (ASTM D256) | No break | 14.7 | No break | 3.1 | No break | 2.6 |
| Notched Izod Impact, Ft-lb/in (@ ~−40° C.) (ASTM D256) | 2.4 | 0.9 | 1.3 | 0.6 | 1.4 | 0.4 |

[8]Fortilene 9300 (Solvay Polymers)

Table II illustrates toughened polymer compositions utilizing various amounts of extender oil and the thermoplastic elastomer component as set forth in Table I. The toughenedpolymer blend was prepared in the same manner as set forth above. Table II illustrates that generally low amounts of oil do not adversely affect the properties of the toughened polymer compositions.

TABLE II

|  | Example 4 | Example 5 | Example 6 | Example 7 | Example 8 | Example 9 | Example 10 | Example 11 | Example 12 | Example 13 |
|---|---|---|---|---|---|---|---|---|---|---|
| Oil (parts by weight) | 0.000 | 5.255 | 10.511 | 15.766 | 21.022 | 0.000 | 3.996 | 7.991 | 11.987 | 15.982 |
| Thermoplastic Elastomer Composition (parts by weight) (Table I) | 225.70 | 225.70 | 225.70 | 225.70 | 225.70 | 225.70 | 225.70 | 225.70 | 225.70 | 225.70 |
| Polypropylene[8] (thermoplastic polymer component) (parts by weight) | 250 | 250 | 250 | 250 | 250 | 400 | 400 | 400 | 400 | 400 |
| TOTAL (parts by weight) | 475.70 | 480.95 | 486.21 | 491.46 | 496.72 | 625.70 | 629.69 | 633.69 | 637.68 | 641.68 |
| Rubber component parts per 100 parts by weight matrix polymer and thermoplastic polymer component | 28.90 | 28.90 | 28.90 | 28.90 | 28.90 | 20.16 | 20.16 | 20.16 | 20.16 | 20.16 |
| CROSSLINKED RUBBER, Wt. % | 21.022 | 20.792 | 20.567 | 20.347 | 20.130 | 15.980 | 15.881 | 15.780 | 15.682 | 15.584 |
| POLYOLEFIN, Wt. % | 72.735 | 71.939 | 71.163 | 70.401 | 69.656 | 79.271 | 78.768 | 78.272 | 77.781 | 77.297 |
| Oil, Wt. % | 2.102 | 3.172 | 4.219 | 5.243 | 6.245 | 1.598 | 2.223 | 2.839 | 3.448 | 4.049 |
| OTHERS, Wt. % | 4.141 | 4.096 | 4.052 | 4.008 | 3.966 | 3.148 | 3.128 | 3.109 | 3.089 | 3.070 |
| TOTAL WEIGHT % | 100.0 | 100.0 | 100.0 | 100.0 | 100.0 | 100.0 | 100.0 | 100.0 | 100.0 | 100.0 |
| Specific Gravity (ASTM D792) | 0.90 | 0.92 | 0.91 | 0.90 | 0.90 | 0.91 | 0.91 | 0.91 | 0.91 | 0.91 |

TABLE II-continued

|  | Example 4 | Example 5 | Example 6 | Example 7 | Example 8 | Example 9 | Example 10 | Example 11 | Example 12 | Example 13 |
|---|---|---|---|---|---|---|---|---|---|---|
| Hardness, Shore D (Inst/10 Sec.) (ASTM D2240) | 72/68 | 68/64 | 65/60 | 66/60 | 64/59 | 74/70 | 69/63 | 69/63 | 69/63 | 69/63 |
| Hardness, Rockwell "R" (ASTM D785) | 49.3 | — | — | — | — | 62.0 | — | — | — | — |
| Tensile Strength (2"/min), Psi (ASTM D638) | 3640 | 2520 | 2910 | 2940 | 2910 | 3720 | 3210 | 3130 | 3160 | 3260 |
| Elongation @ Break (2"/min), % (ASTM D638) | 500 | 570 | 620 | 580 | 600 | 540 | 630 | 640 | 610 | 520 |
| Low Temperature Break, ° C. (ASTM D746) | −47 | ~−60 | −56 | −56 | −54 | −39 | −54 | −56 | −52 | −40 |
| MI, g/10 min (230° C./2.16 kg) (ASTM D1238) | 1.51 | 1.90 | 1.30 | 1.50 | 1.35 | 2.63 | 2.07 | 2.36 | 2.47 | 2.30 |
| MI, g/10 min (230° C./5.0 kg) (ASTM D 1238) | 7.60 | 9.30 | 6.52 | 7.33 | 6.95 | 12.75 | 11.10 | 11.60 | 11.40 | 10.80 |
| Unnotched Izod Impact, Ft.-lb/in (@ ~23° C.) (ASTM D256) | No break | No break | No break | No break | No break | No break | No break | No break | No break | No break |
| Unnotched Izod Impact, Ft.-lb/in (@ ~−40° C.) (ASTM D256) | No break | No break | No break | No break | No break | 19.8 | No break | No break | No break | No break |
| Notched Izod Impact, Ft.-lb/in (@~23° C.) (ASTM D256) | No break | No break | No break | No break | No break | 4.2 | 3.3 | 4.0 | 4.0 | 3.2 |
| Notched Izod Impact, Ft.-lb/in (@~−40° C.) (ASTM D256) | 1.3 | 1.300 | 1.500 | 1.500 | 1.300 | 1.200 | 1.200 | 1.300 | 1.000 | 1.000 |

[8]Fortilene 9300 (Solvay Polymers)

Example 2

Polyester-based toughened polymer compositions were prepared in a further example. A thermoplastic elastomer component was prepared in a first step, wherein an acrylic rubber component was blended with a polyester matrix polymer in amounts as listed in Table III and subsequently cured. A control formulation was also prepared which was not cured during melt blending as it lacked a crosslinking agent. The thermoplastic elastomer component and control formulation were each melt blended for about three minutes in a banbury after the stock temperature reached about 230° C. The control compound was removed and formed into a sheet on a roll mill and cooled. The noted crosslinking agents were added to the respective thermoplastic elastomer component (TPV) after the first melt mixing step, and mixing was continued for three minutes after maximum torque was reached. Care was taken to maintain a temperature below about 235° C. utilizing cooling water through the equipment and/or reduction in mixing speed. The thermoplastic elastomer components were each removed from the banbury and formed into a sheet by passing through a roll mill. The control formulation and thermoplastic elastomer component were each melt mixed with various amounts of polyester thermoplastic polymer components in the amounts shown in Table IIIA. The toughened polymer composition blends were melt mixed in a banbury at about 230° C. for three minutes for a first mixing, and then for about a two minute remixing period. The compositions were granulated and injection molded to produce test samples. The compositions exhibited the properties listed in Table IIIA.

The results listed in Table IIIA show that the toughened polymer compositions of the present invention exhibit higher hardness, and higher notched izod impact values when compared to the control formulations at different thermoplastic elastomer component levels.

TABLE III

|  | Control | TPV 1 | TPV 2 | TPV 3 |
|---|---|---|---|---|
| Polyester[1] (matrix polymer) | 40.0 | 40.0 | 40.0 | 40.0 |
| Acrylic Rubber[2] (rubber component) | 60.0 | 60.0 | 60.0 | 60.0 |
| Neopentyl(diallyl)oxytri(N-ethylenediamino)ethyl titanate[3] (crosslinking agent) | — | 0.9 | 1.2 | — |
| Magnesium Oxide[4] (crosslinking agent) | — | — | — | 3.0 |
| Stabilizer[5] | 0.6 | 0.6 | 0.6 | 0.6 |
| Stabilizer[6] | 0.2 | 0.2 | 0.2 | 0.2 |
| Calcium Stearate | 0.3 | 0.3 | 0.3 | 0.3 |
| Magnesium Stearate[7] | 0.3 | 0.3 | 0.3 | 0.3 |
| TOTAL (parts by weight) | 101.40 | 102.30 | 102.60 | 104.40 |

[1]Valox 315 (polybutylene terephthlate) (General Electric)
[2]Vamac G (DuPont)
[3]Kenreact Lica 44 (Kenrich Petrochemicals)
[4]Maglite D (C. P. Hall)
[5]Ethanox 330 (Albermarle Corp.)
[6]DSTDP (Cytec Industries)
[7](Crompton)

TABLE IIIA

|  | Control Ex. 1 | Control Ex. 2 | Control Ex. 3 | Example 1 | Example 2 | Example 3 | Example 4 | Example 5 | Example 6 | Example 7 | Example 8 | Example 9 |
|---|---|---|---|---|---|---|---|---|---|---|---|---|
| TPV 1(parts by weight) (Table III) | — | — | — | 102.30 | 102.30 | 102.30 | — | — | — | — | — | — |
| TPV 2 (parts by weight) (Table III) | — | — | — | — | — | — | 102.60 | 102.60 | 102.60 | — | — | — |
| TPV 3 (parts by weight) (Table III) | — | — | — | — | — | — | — | — | — | 104.40 | 104.40 | 104.40 |
| Control (parts by weight) (Table III) | 101.4 | 101.4 | 101.4 | — | — | — | — | — | — | — | — | — |
| Polyesters (thermoplastic polymer component) (parts by weight) | 300 | 200 | 140 | 300 | 200 | 140 | 300 | 200 | 140 | 300 | 200 | 140 |
| TOTAL (parts by weight) | 401.40 | 301.40 | 241.40 | 402.30 | 302.30 | 242.30 | 402.60 | 302.60 | 242.60 | 404.40 | 304.40 | 244.40 |
| RUBBER (Crosslinked or uncrosslinked), Wt % | 14.95 | 19.90 | 24.86 | 14.91 | 19.85 | 24.76 | 14.90 | 19.83 | 24.73 | 14.84 | 19.71 | 24.55 |
| POLYESTER (PBT), Wt % | 84.70 | 79.64 | 74.56 | 84.52 | 79.39 | 74.29 | 84.45 | 79.31 | 74.20 | 84.07 | 78.84 | 73.65 |
| OTHER, Wt. % | 0.35 | 0.46 | 0.58 | 0.57 | 0.76 | 0.95 | 0.65 | 0.86 | 1.07 | 1.09 | 1.45 | 1.80 |
| TOTAL WEIGHT % | 100.0 | 100.0 | 100.0 | 100.00 | 100.00 | 100.00 | 100.00 | 100.00 | 100.00 | 100.00 | 100.00 | 100.00 |
| PROPERTIES |  |  |  |  |  |  |  |  |  |  |  |  |
| Specific Gravity (ASTM D792) | 1.26 | 1.24 | 1.23 | 1.25 | 1.24 | 1.22 | 1.26 | 1.24 | 1.23 | 1.26 | 1.24 | 1.23 |
| Hardness, Shore D(Inst/10 Sec.) (ASTM 2240) | 73 | 70 | 70 | 75 | 73 | 70 | 76 | 75 | 71 | 73 | 73 | 68 |
| Tensile Strength @yield (2"/min), Psi (ASTM D638) | 5420 | 5110 | 4740 | 5120 | 4710 | 4120 | 4730 | 4160 | 3640 | 5220 | 4490 | 3740 |
| Elongation @ yield (2"/min), % (ASTM D638) | 5 | 5 | 6 | 6 | 11 | 15 | 5 | 5 | 5 | 4 | 4 | 5 |
| Tensile Strength @ break (2"/min), Psi (ASTM D638) | 3820 | 3550 | 2670 | 5020 | 4570 | 4550 | 5920 | 5320 | 5060 | 5050 | 4920 | 5130 |
| Elongation @ Break (2"/min), % (ASTM D638) | 72 | 150 | 140 | 220 | 300 | 310 | 360 | 370 | 380 | 280 | 350 | 360 |
| Izod Impact, Ft.-lb/in (@ ~25° C.) (ASTM D256) | 10.7 | 13.5 | 16.4 | 12.2 | 16.7 | 24.5 | 12.1 | 15.3 | 22.1 | 12.6 | 18.5 | 20.6 |
| Notched Izod Impact, Ft.-lb/in (@ ~20° C.) (ASTM D256) | 2.78 | 3.88 | 4.56 | 3.96 | 4.37 | 5.62 | 4.46 | 4.46 | 5.19 | 3.81 | 4.42 | 5.38 |

[8]Valox 315 (General Electric)

Example 3

Polyamide-based toughened polymer compositions were prepared in a further example. A thermoplastic elastomer component was prepared in a first step, wherein an acrylic rubber component was blended with a polyamide matrix polymer in amounts as listed in Table IV and subsequently cured. A control formulation was also prepared which was not cured during melt blending as it lacked a crosslinking agent. A thermoplastic elastomer component and control formulation were each melt blended for about three minutes in a banbury after the stock temperature reached about 230° C. The control compound was removed and formed into a sheet on a roll mill and cooled. The noted crosslinking agents were added to the thermoplastic elastomer component after the first melt mixing step, and mixing was continued for three minutes after maximum torque was reached. Care was taken to maintain a temperature below about 235° C. utilizing cooling water through the equipment and/or reduction in mixing speed. The thermoplastic elastomer components were each removed from the banbury and formed into a sheet by passing through a roll mill. The control formulation and thermoplastic elastomer component were each melt mixed with various amounts of polyamide thermoplastic polymer components in the amounts shown in Table IVA. The toughened polymer composition blends were melt mixed in a banbury at about 230° C. for three minutes for a first mixing, and then about a two minute remixing period. The compositions were granulated and injection molded to produce test samples.

The results listed in Table IVA show that the toughened polymer compositions of the present invention exhibit similar hardness, and higher notched izod impact values when compared to the controlled formulations at different thermoplastic elastomer component levels.

TABLE IV

|  | Control | TPV 1 | TPV 2 |
|---|---|---|---|
| Polyamide[1] (matrix polymer) | 40.0 | 40.0 | 40.0 |
| Acrylic Rubber[2] (rubber component) | 60.0 | 60.0 | 60.0 |
| Neopentyl(diallyl)oxytri(N-ethylenediamino)ethyl titanate[3] (crosslinking agent) | — | 1.2 | 1.2 |
| Magnesium Oxide[4] (crosslinking agent) | — | — | 3.0 |
| Stabilizer[5] | 0.6 | 0.6 | 0.6 |
| Stabilizer[6] | 0.2 | 0.2 | 0.2 |
| Calcium Stearate | 0.3 | 0.3 | 0.3 |
| Magnesium Stearate[7] | 0.3 | 0.3 | 0.3 |
| TOTAL (parts by weight) | 101.40 | 102.60 | 104.40 |

[1]Ultramid 8202 Nylon-6 (BASF)
[2]Vamac G (DuPont)
[3]Kenreact Lica 44 (Kenrich Petrochemicals)
[4]Maglite D (C. P. Hall)
[5]Ethanox 330 (Albemarle Corp.)
[6]DSTDP (Cytec Industries)
[7](Crompton)

TABLE IVA

|  | Control Ex. 1 | Control Ex. 2 | Control Ex. 3 | Example 1 | Example 2 | Example 3 | Example 4 | Example 5 | Example 6 |
|---|---|---|---|---|---|---|---|---|---|
| TPV 1 (parts by weight) (Table IV) | — | — | — | 102.60 | 102.60 | 102.60 | — | — | — |
| TPV 2 (parts by weight) (Table IV) | — | — | — | — | — | — | 104.40 | 104.40 | 104.40 |
| Control 1 (parts by weight) (Table IV) | 101.4 | 101.4 | 101.4 | — | — | — | — | — | — |
| polyamide (thermoplastic polymer component) (parts by weight) | 300 | 200 | 140 | 300 | 200 | 140 | 300 | 200 | 140 |
| TOTAL (parts by weight) | 401.40 | 301.40 | 241.40 | 402.60 | 302.60 | 242.60 | 404.40 | 304.40 | 244.40 |
| RUBBER (Crosslinked or uncrosslinked) | 14.95 | 19.90 | 24.86 | 14.91 | 19.85 | 24.76 | 14.84 | 19.71 | 24.55 |
| POLYAMIDE (Nylon-6) | 84.70 | 79.64 | 74.56 | 84.52 | 79.39 | 74.29 | 84.07 | 78.84 | 73.65 |
| OTHER, Wt. % | 0.35 | 0.46 | 0.58 | 0.57 | 0.76 | 0.95 | 1.09 | 1.45 | 1.80 |
| TOTAL WEIGHT % | 100.0 | 100.0 | 100.0 | 100.00 | 100.00 | 100.00 | 100.00 | 100.00 | 100.00 |
| PROPERTIES |  |  |  |  |  |  |  |  |  |
| Specific Gravity (ASTM D792) | 1.11 | 1.10 | 1.10 | 1.11 | 1.11 | 1.11 | 1.11 | 1.13 | 1.10 |
| Hardness, Shore D(Inst/10 Sec.) (ASTM 2240) | 79 | 79 | 76 | 79 | 75 | 73 | 78 | 75 | 72 |
| Tensile Strength @yield (2"/min), Psi (ASTM D638) | 6400 | 5700 | 5160 | 5800 | 5200 | 4600 | 6200 | 5800 | 4760 |
| Elongation @ yield (2"/min), % (ASTM D638) | 10 | 10 | 12 | 20 | 25 | 30 | 10 | 6 | 10 |
| Tensile Strength @ break (2"/min) Psi (ASTM D638) | 8200 | 6100 | 6820 | 7000 | 6600 | 6180 | 7000 | 7700 | 6400 |
| Elongation @ Break (2"/min), % (ASTM D638) | 260 | 200 | 270 | 280 | 290 | 310 | 320 | 360 | 340 |
| Izod Impact, Ft.-lb/in (@ ~25° C.) (ASTM D256) | 5.3 | 9.9 | 12.6 | 9.4 | 14.0 | 19.8 | 10.8 | 17.2 | 20.5 |
| Notched Izod Impact, Ft.-lb/in (@ ~20° C.) (ASTM D256) | 0.33 | 2.74 | 3.03 | 2.25 | 4.10 | 4.78 | 2.04 | 3.20 | 3.33 |

[8]Ultramid 8202 (BASF)

Tables V and VA illustrate additional toughened polymer compositions of the present invention as compared to a control formulation. In this experiment, two different rubber components and a filler were used in the same thermoplastic elastomer composition to show that rubber blends form effective toughened polymer compositions. The thermoplastic elastomer composition, controls, and the toughened blends were prepared in the same manner as set forth above.

The results listed in Table VA show that blends of more than one rubber and more than one polyolefin are effectively utilized to form a toughened polymer composition having desired properties. The toughened polymer compositions of Examples 14 and 15 exhibit higher tensile strength, higher hardness, and both unnotched izod impact and notched izod impact at the tested temperature ranges, when compared to example formulations with rubber components which were not crosslinked.

TABLE V

|  | Thermoplastic Elastomer Composition 2 | Control 2 |
|---|---|---|
| EPDM Rubber[1] (rubber component) | 90 | 90 |
| EPDM Rubber[9] (rubber component) | 10 | 10 |
| Polypropylene[2] (matrix polymer) | 90 | 90 |
| Polyethylene[3] (matrix polymer) | 6 | 6 |
| Calcium Carbonate Filler | 40 | 40 |
| Liquid Polybutadiene[4] | 5 | 0.0 |
| Peroxide[5] (crosslinking agent) | 1.10 | 0.0 |
| UV Stabilizer[6] | 1.80 | 1.80 |
| Calcium Stearate | 0.55 | 0.55 |
| Polyethylene Wax | 1.25 | 1.25 |
| Processing Oil[7] | 10.000 | 10.000 |
| TOTAL (parts by weight) | 255.70 | 249.60 |

[9]Royaltuf 485 (Uniroyal)

TABLE VA

|  | Example 14 | Control Ex. 14 | Example 15 | Control Ex. 15 |
|---|---|---|---|---|
| Control 2 | — | 249.60 | — | 249.60 |
| Thermoplastic Elastomer Composition (parts by weight) | 255.70 | — | 255.70 | — |
| Polypropylene[8] (thermoplastic polymer component) (parts by weight) | 150 | 150 | 250 | 250 |
| TOTAL WEIGHT (parts by weight) | 405.70 | 399.60 | 505.70 | 499.60 |
| Rubber component parts by weight per 100 parts matrix polymer and thermoplastic polymer component | 40.65 | 40.65 | 28.90 | 28.90 |
| CROSSLINKED RUBBER, Wt. % | 24.649 | 25.025 | 19.775 | 20.016 |

TABLE VA-continued

|  | Example 14 | Control Ex. 14 | Example 15 | Control Ex. 15 |
|---|---|---|---|---|
| POLYOLEFIN, Wt. % | 60.635 | 61.562 | 68.420 | 69.255 |
| Oil, Wt. % | 2.465 | 2.503 | 1.977 | 2.002 |
| OTHERS, Wt. % | 12.250 | 10.911 | 9.828 | 8.727 |
| TOTAL WEIGHT % | 100.0 | 100.0 | 100.0 | 100.0 |
| pecific Gravity (ASTM D792) | 0.99 | 0.98 | 0.93 | 0.91 |
| Hardness, Shore D (Inst/10 Sec.) (ASTM D2240) | 67/62 | 66/58 | 72/67 | 66/56 |
| Hardness, Rockwell "R" (ASTM D785) | 37.5 | — | 46.2 | — |
| Tensile Strength (20"/min), Psi (ASTM D638) | 3620 | 2190 | 3830 | 2430 |
| Elongation @ Break (20"/min), % (ASTM D638) | 550 | 600 | 530 | 680 |
| Low Temperature Break, ° C. (ASTM D746) | ~–60 | ~–60 | –50 | ~–60 |
| MI, g/10 min (230° C./2.16 kg) (ASTM D 1238) | 0.72 | 0.94 | 1.28 | 1.65 |
| MI, g/10 min (230° C./5.0 kg) (ASTM D 1238) | 4.18 | 4.68 | 6.58 | 7.93 |
| Unnotched Izod Impact, Ft.-lb/in (@ ~23° C.) (ASTM D256) | No break | No break | No break | No break |
| Unnotched Izod Impact, Ft.-lb/in (@ ~–40° C.) (ASTM D256) | 22.9 | 15.5 | 24.7 | 19.7 |
| Notched Izod Impact, Ft.-lb/in (@ ~23° C.) (ASTM D256) | No break | 12.0 | No break | 13.4 |
| Notched Izod Impact, Ft.-lb/in (@ ~–40° C.) (ASTM D256) | 1.7 | 1.4 | 1.3 | 1.2 |

[8]Fortilene 9300 (Solvay Polymers)

In accordance with the patent statutes, the best mode and preferred embodiment have been set forth; the scope of the invention is not limited thereto, but rather by the scope of the attached claims.

What is claimed is:

1. A process for preparing a toughened polymer composition, comprising the steps of:
    combining a rubber component and a matrix polymer, said matrix polymer comprising a polyester or polyamide;
    mixing and crosslinking the rubber component in the presence of the matrix polymer with a crosslinking agent at a temperature above the melting point of the matrix polymer to form a thermoplastic elastomer component; and
    blending the thermoplastic elastomer component with a thermoplastic polymer component comprising a polyester or polyamide to form the toughened polymer composition, wherein the toughened polymer composition optionally includes a compatibilizer.

2. A process according to claim 1, wherein the rubber component of the thermoplastic elastomer component is present in an amount from about 2 to about 60 parts by weight per 100 parts by weight of the matrix polymer of the thermoplastic elastomer component and the thermoplastic polymer component.

3. A process according to claim 2, wherein the thermoplastic polymer component and matrix polymer of the thermoplastic elastomer component are, independently, a polyamide derived from polycondensation of a diamine having from 4 to 12 carbon atoms and a dibasic acid having from 4 to 12 carbon atoms; or derived from selfpolycondensation of an amino acid; or derived from polymerization of a lactam; or a polyester derived from a dicarboxylic acid having from about 2 to about 16 carbon atoms and a diol or diol derivative having from about 2 to about 16 carbon atoms; or derived from selfcondensation of a hydroxy carboxylic acid; or derived from ring opening polymerization of a lactone, wherein the rubber component of the thermoplastic elastomer component is derived from at least two different alpha olefin monomers, or is styrene butadiene rubber, hydrogenated styrene butadiene rubber, butyl rubber, butyl-paramethyl styrene copolymer or derivatives thereof, styrenic block copolymer, acrylic rubber, nitrile rubber, hydrogenated nitrile rubber, or ethylene methacrylate terpolymer rubber, or any combination thereof.

4. A process according to claim 3, wherein the crosslinked rubber component of the thermoplastic elastomer component has an average particle size of about 0.005 to about 25 microns, and wherein the thermoplastic elastomer component and thermoplastic polymer component are melt blended.

5. A process according to claim 1, wherein said thermoplastic polymer component is nylon-4, nylon-4,6, polyhexamethyleneadipamide (nylon-6,6), polycaprolactam (nylon-6), nylon 6,9, polyhexamethylenesebacamide (nylon-6,10), nylon-11, nylon-12 or copolymers thereof; or polyethylene terephthalate, polybutylene terephthalate, polyethylene isophthalate, or a block polyetherester, or a combination thereof; and wherein said rubber component of the thermoplastic elastomer component is an acrylic rubber.

6. A process according to claim 5, wherein the rubber component of the thermoplastic elastomer component is present in an amount from about 40 to about 90 parts by weight per 100 parts by weight of the rubber component and the matrix polymer of the thermoplastic elastomer component, and wherein the rubber component of the thermoplastic elastomer component is present in an amount from about 5 to about 50 parts by weight per 100 parts by weight of the matrix polymer of the thermoplastic elastomer component and the thermoplastic polymer component.

7. A process according to claim 2, wherein the rubber component of the thermoplastic elastomer component is present in an amount from about 10 to about 45 parts by weight per 100 parts by weight of the matrix polymer of the thermoplastic elastomer component and the thermoplastic polymer component.

8. A process according to claim 7, wherein the crosslinked rubber component of the thermoplastic elastomer component has an average particle size of from about 0.1 to about 10 microns, wherein the rubber is crosslinked at a temperature of at least 10° C. higher than the melt temperature of the matrix polymer of the thermoplastic elastomer component, and wherein blending of the thermoplastic elastomer component and the thermoplastic polymer component is conducted at a temperature greater than 10° C. above the melting point of the thermoplastic polymer component.

9. A process according to claim 8, wherein the thermoplastic polymer component and the matrix polymer of the thermoplastic elastomer component, independently, are polybutylene terephthalate, polyethylene terephthalate, nylon-6, or nylon-6,6.

10. A process according to claim 9, wherein the toughened polymer composition contains less than about 10 parts of plasticizer, based on 100 parts by weight of the rubber component of the thermoplastic elastomer component, and wherein the rubber component of the thermoplastic elastomer component is present in an amount from 18 to about 45 parts by weight per 100 parts by weight of the matrix polymer of the thermoplastic elastomer component and the thermoplastic polymer component.

11. A method for producing rotationally molded articles having toughness, comprising the steps of:
    introducing a toughened polymer composition into a mold of a rotational molding device, said toughened polymer composition comprising a thermoplastic polymer component, a thermoplastic elastomer component comprising a matrix polymer and a crosslinked rubber component, and optionally a compatibilizer, said matrix polymer being a polyamide or polyester; and
    rotationally molding at least the toughened polymer composition thereby forming an article.

12. A method according to claim 11, wherein the rubber component of the thermoplastic elastomer component is present in an amount from about 2 to about 60 parts by weight per 100 parts by weight of the matrix polymer of the thermoplastic elastomer component and the thermoplastic polymer component.

13. A method according to claim 12, wherein the thermoplastic polymer component and matrix polymer of the thermoplastic elastomer component are, independently, a polyamide derived from polycondensation of a diamine having from 4 to 12 carbon atoms and a dibasic acid having from 4 to 12 carbon atoms; or derived from selfpolycondensation of an amino acid; or derived from polymerization of a lactam; or a polyester derived from a dicarboxylic acid having from about 2 to about 16 carbon atoms and a diol or diol derivative having from about 2 to about 16 carbon atoms; or derived from selfcondensation of a hydroxy carboxylic acid; or derived from ring opening polymerization of a lactone, wherein the rubber component of the thermoplastic elastomer component is derived from at least two different alpha olefin monomers, or is styrene butadiene rubber, hydrogenated styrene butadiene rubber, butyl rubber, butyl-paramethyl styrene copolymer or derivatives thereof, styrenic block copolymer, acrylic rubber, nitrile rubber, hydrogenated nitrile rubber, or ethylene methacrylate terpolymer rubber, or any combination thereof.

14. A method according to claim 13, wherein the crosslinked rubber component of the thermoplastic elastomer component has an average particle size of 0.005 to about 25 microns, and wherein the thermoplastic elastomer component and thermoplastic polymer component are melt blended.

15. A method according to claim 11, wherein said thermoplastic polymer component is nylon-4, nylon-4,6, polyhexamethyleneadipamide (nylon-6,6), polycaprolactam (nylon-6), nylon 6,9, polyhexamethylenesebacamide (nylon-6,10), nylon-11, nylon-12 or copolymers thereof; or polyethylene terephthalate, polybutylene terephthalate, polyethylene isophthalate, or a block polyetherester, or a combination thereof; and wherein said rubber component of the thermoplastic elastomer component is an acrylic rubber.

16. A method according to claim 15, wherein the rubber component of the thermoplastic elastomer component is present in an amount from about 40 to about 90 parts by weight per 100 parts by weight of the rubber component and the matrix polymer of the thermoplastic elastomer component, and wherein the rubber component of the thermoplastic elastomer component is present in an amount from about 5 to about 50 parts by weight per 100 parts by weight of the matrix polymer of the thermoplastic elastomer component and the thermoplastic polymer component.

17. A method according to claim 16, wherein the rubber component of the thermoplastic elastomer component is present in an amount from about 10 to about 45 parts by weight per 100 parts by weight of the matrix polymer of the thermoplastic elastomer component and the thermoplastic polymer component.

18. A method according to claim 17, wherein the crosslinked rubber component of the thermoplastic elastomer component has an average particle size of from about 0.1 to about 10 microns, wherein the rubber is crosslinked at a temperature of at least 10° C. higher than the melt temperature of the matrix polymer of the thermoplastic elastomer component, and wherein blending of the thermoplastic elastomer component and the thermoplastic polymer component is conducted at a temperature greater than 10° C. above the melting point of the thermoplastic polymer component.

19. A method according to claim 18, wherein the thermoplastic polymer component and the matrix polymer of the thermoplastic elastomer component, independently, are polybutylene terephthalate, polyethylene terephthalate, nylon-6, or nylon-6,6.

20. A method according to claim 19, wherein the toughened polymer composition contains less than about 10 parts of plasticizer based on 100 parts by weight of the rubber component of the thermoplastic elastomer component, and wherein the rubber component of the thermoplastic elastomer component is present in an amount from 18 to about 42 parts by weight per 100 parts by weight of the matrix polymer of the thermoplastic elastomer component and the thermoplastic polymer component.

21. A toughened thermoplastic composition, comprising:
    a blend including a) a thermoplastic polymer component, and b) a thermoplastic elastomer component derived from a rubber component crosslinked in the presence of a matrix polymer, said matrix polymer comprising a polyamide or polyester, the rubber component being present in an amount from about 2 to about 60 parts per 100 parts by weight of the matrix polymer and the thermoplastic polymer component, and wherein the toughened thermoplastic composition optionally comprises a compatibilizer.

22. A composition according to claim 21, wherein the thermoplastic polymer component and matrix polymer of the thermoplastic elastomer component are, independently, a polyamide derived from polycondensation of a diamine having from 4 to 12 carbon atoms and a dibasic acid having from 4 to 12 carbon atoms; or derived from selfpolycondensation of an amino acid; or derived from polymerization of a lactam; or a polyester derived from a dicarboxylic acid having from about 2 to about 16 carbon atoms and a diol or diol derivative having from about 2 to about 16 carbon atoms; or derived from selfcondensation of a hydroxy carboxylic acid; or derived from ring opening polymerization of a lactone, wherein the rubber component of the thermoplastic elastomer component is derived from at least two different alpha olefin monomers, or is styrene butadiene rubber, hydrogenated styrene butadiene rubber, butyl rubber, butyl-paramethyl styrene copolymer or derivatives thereof, styrenic block copolymer, acrylic rubber, nitrile rubber, hydrogenated nitrile rubber, or ethylene methacrylate terpolymer rubber, or any combination thereof.

23. A composition according to claim 22, wherein the crosslinked rubber component of the thermoplastic elastomer component has an average particle size of about 0.005 to about 25 microns, and wherein the thermoplastic elastomer component and thermoplastic polymer component are melt blended.

24. A composition according to claim 23, wherein said thermoplastic polymer component is nylon-4, nylon-4,6, polyhexa-methyleneadipamide (nylon-6,6), polycaprolactam (nylon-6), nylon 6,9, polyhexa-methylenesebacamide (nylon-6,10), nylon-11, nylon-12 or copolymers thereof; or polyethylene terephthalate, polybutylene terephthalate, polyethylene isophthalate, or a block polyetherester, or a combination thereof; and wherein said rubber component of the thermoplastic elastomer component is an acrylic rubber.

25. A composition according to claim 24, wherein the rubber component of the thermoplastic elastomer component is present in an amount from about 5 to about 50 parts by weight per 100 parts by weight of the matrix polymer of the thermoplastic elastomer component and the thermoplastic polymer component.

26. A composition according to claim 25, wherein the rubber component of the thermoplastic elastomer component is present in an amount from 45 to 70 parts by weight per 100 parts by weight of the rubber component and the matrix polymer of the thermoplastic elastomer component, and wherein the rubber component of the thermoplastic elastomer component is present in an amount from about 10 to about 45 parts by weight per 100 parts by weight of the matrix polymer of the thermoplastic elastomer component and the thermoplastic polymer component.

27. A composition according to claim 26, wherein the crosslinked rubber component of the thermoplastic elastomer component has an average particle size of from about 0.1 to about 10 microns, wherein the rubber is crosslinked at a temperature of at least 10° C. higher than the melt temperature of the matrix polymer of the thermoplastic elastomer component, and wherein blending of the thermoplastic elastomer component and thermoplastic polymer component is conducted at a temperature greater than 10° C. above the melting point of the thermoplastic polymer component.

28. A composition according to claim 27, wherein the thermoplastic polymer component and the matrix polymer of the thermoplastic elastomer component, independently, are polybutylene terephthalate, polyethylene terephthalate, nylon-6, or nylon-6,6.

29. A composition according to claim 28, wherein the toughened composition contains less than about 10 parts of plasticizer based on 100 parts by weight of the rubber component of the thermoplastic elastomer component, and wherein the rubber component of the thermoplastic elastomer component is present in an amount from about 18 to about 42 parts per 100 parts by weight of the matrix polymer of the thermoplastic elastomer component and the thermoplastic polymer component.

* * * * *